United States Patent [19]
Gass et al.

[11] Patent Number: 5,992,939
[45] Date of Patent: Nov. 30, 1999

[54] HEAD REST SLEEVE

[75] Inventors: Paul E. Gass, Mokena; Philip A. Taylor, New Lenox, both of Ill.

[73] Assignee: Illinois Tool works Inc., Glenview, Ill.

[21] Appl. No.: 08/934,907

[22] Filed: Sep. 22, 1997

[51] Int. Cl.$^6$ .................................................. A47C 15/00
[52] U.S. Cl. ...................... 297/463.1; 297/410; 403/375; 403/3
[58] Field of Search .................. 403/375, 3; 297/410, 297/391, 463.1, 463.2, DIG. 2; 248/314, 315, 316.2

[56] References Cited

U.S. PATENT DOCUMENTS

| | | | |
|---|---|---|---|
| 3,096,960 | 7/1963 | Kinney | 248/314 X |
| 3,664,617 | 5/1972 | Fenwick | 248/314 X |
| 5,445,434 | 8/1995 | Kohut | 297/391 |
| 5,667,276 | 9/1997 | Connelly et al. | 297/410 |
| 5,738,413 | 4/1998 | De Filippo | 297/410 |
| 5,788,250 | 8/1998 | Masters et al. | 297/410 |

*Primary Examiner*—Milton Nelson, Jr.
*Attorney, Agent, or Firm*—Kane, Dalsimer, Sullivan, Kurucz, Levy, Eisele and Richard, LLP

[57] ABSTRACT

A head rest sleeve for receiving a head rest support rod having a diameter within a known tolerance range is formed of a resilient material and has a body having an axial bore. Integral with the inside of the body and disposed thereabout are at least two pairs of compressible crush ribs which protrude radially and extend the length of the body. The distance of protrusion of the ribs corresponds to the minimum possible diameter of the support rod. Located between each pair of ribs and integral therewith is a web which protrudes radially a distance corresponding to the maximum possible diameter of the support rod. When the support rod is inserted into the sleeve, the rod frictionally engages the crush ribs uniformly along its length and, when the diameter of the support rod is greater than the minimum possible diameter, compresses the ribs a uniform distance to allow the support rod to be moved in the sleeve. When the support rod has a maximum diameter, the ribs are compressed such that the support rod frictionally engages the webs as well as the ribs. In this manner a tight friction fit between the sleeve and the support rod is guaranteed regardless of the actual diameter of the support rod.

6 Claims, 5 Drawing Sheets

HEAD REST SLEEVE

BACKGROUND OF THE INVENTION

1. Field of the Invention

This invention relates to a head rest sleeve for receiving a cylindrical head rest support rod, and, more particularly, to a head rest sleeve formed of a resilient material comprising pairs of internal compressible crush ribs which compensate for variations in the diameter of the support rod. In this manner a tight friction fit between the sleeve and the support rod is achieved regardless of diametral variations in the rod, thereby eliminating the buzz, shake and rattle and side-to-side chuck problems prevalent with prior art head rests.

2. Description of the Prior Art

Prior art head rests generally have a cylindrical support rod and a sleeve for receiving the support rod. Many prior art head rests, however, have proven unsatisfactory in that they are characterized by excessive noise caused by the buzz, shake and rattle of the support rod in the sleeve due to insufficient and uneven frictional engagement between the sleeve and the support rod. This problem has become more significant in recent years as automobiles and other vehicles have been aerodynamically and acoustically designed to reduce noise in the passenger cabin, thereby calling attention to the noise caused by the head rest. A second problem with many prior art head rests is that they are characterized by excessive side-to-side chuck, i.e. side-to-side movement of the head rest, which not only generates noise, but causes a corresponding chuck to the head of the passenger. A third problem with many prior art head rests is that the aforementioned insufficient and uneven frictional engagement between the sleeve and the support rod prevents smooth movement of the support rod in the sleeve, making the adjustment of the head rest awkward for the user.

Therefore, in order to alleviate these problems, an objective of the present invention is to provide a head rest sleeve for receiving and engaging a cylindrical head rest support rod which eliminates the buzz, shake and rattle, and thus the noise caused thereby, prevalent in many prior art head rests. A second objective of the present invention is to provide a head rest sleeve which eliminates side-to-side chuck. A third objective of the present invention is to provide a head rest sleeve which imparts a constant and evenly distributed frictional force to the support rod thereby allowing for smooth insertion and removal of the rod during operation.

SUMMARY OF THE INVENTION

A head rest sleeve in accordance with the present invention achieves the above and other beneficial objects by providing a head rest sleeve formed of a resilient material comprising a body with an axial bore and at least two pairs of compressible crush ribs integral therewith and disposed internally longitudinally therealong which are frictionally engageable with a cylindrical support rod of a head rest having a diameter within a predefined tolerance range.

The crush ribs are arranged pairwise and protrude radially a distance corresponding to the minimum possible diameter of the support rod. Situated between each pair of ribs and integral therewith is a web which protrudes radially a distance corresponding to the maximum possible diameter of the support rod. When the support rod is inserted into the sleeve, the support rod frictionally engages the crush ribs and, when the actual diameter of the support rod is greater than the minimum possible diameter as defined by the rated tolerance, uniformly compresses the crush ribs towards the webs the distance necessary to allow the support rod to be freely inserted into and pulled from the sleeve, while at the same time maintaining a constant and evenly distributed friction force between the support rod and the inside of the sleeve such that the support rod may be smoothly translated therethrough.

In this way the inside of the sleeve is guaranteed to be in tight and uniform frictional engagement with the support rod regardless of where the actual diameter of the support rod is within the tolerance range, thus eliminating buzz, shake and rattle, as well as side-to-side chuck.

DETAILED DESCRIPTION OF THE PREFERRED EMBODIMENT

The aforementioned Figures illustrate a head rest sleeve 10 in which identical numerals in each Figure represent identical elements.

Figure 1:
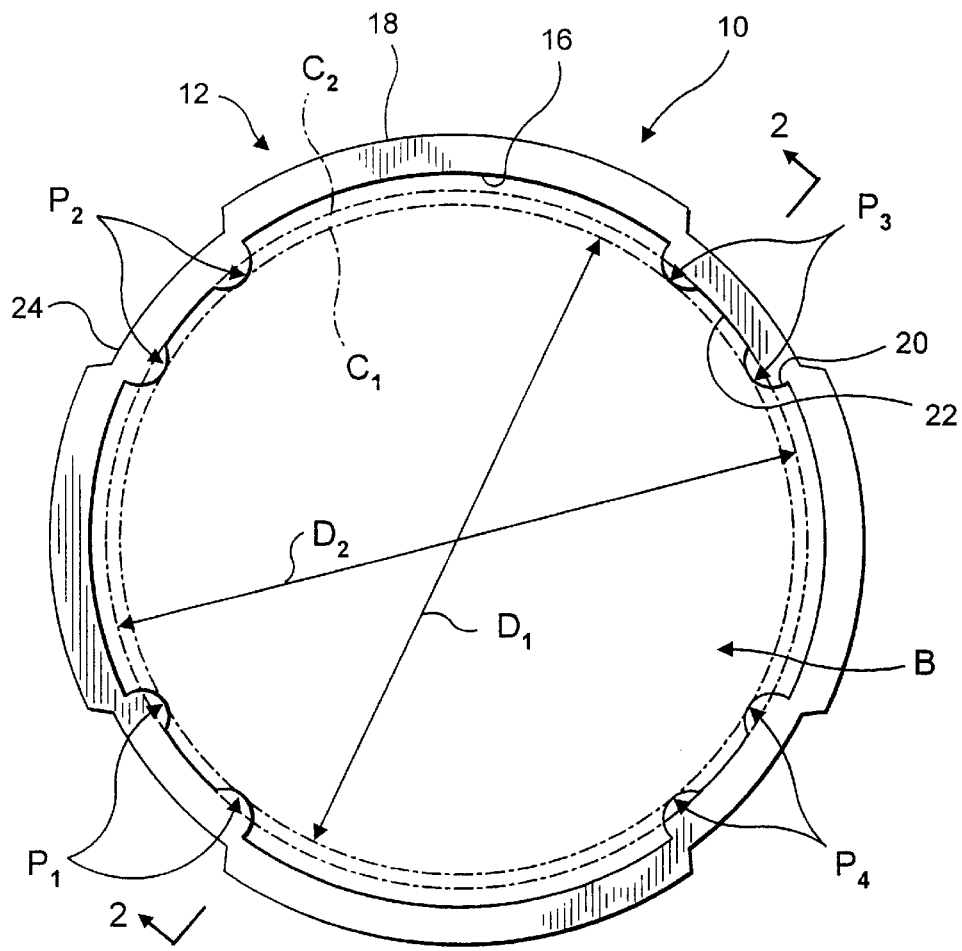
FIG. 1 is a top view of the head rest sleeve according to the present invention.

With reference to FIG. 1, numeral 10 represents the head rest sleeve in accordance with the preferred embodiment of the invention. Head rest sleeve 10 is molded of a resilient plastic material. Head rest sleeve 10 has a cylindrical body 12 with a tapering circular bore B for receiving a cylindrical support rod 14 of a head rest (not pictured). This taper, or draft, allows for easy removal of the sleeve from the injection mold during manufacture. Body 12 has an inside portion 16 and an outside portion 18.

Figure 2:
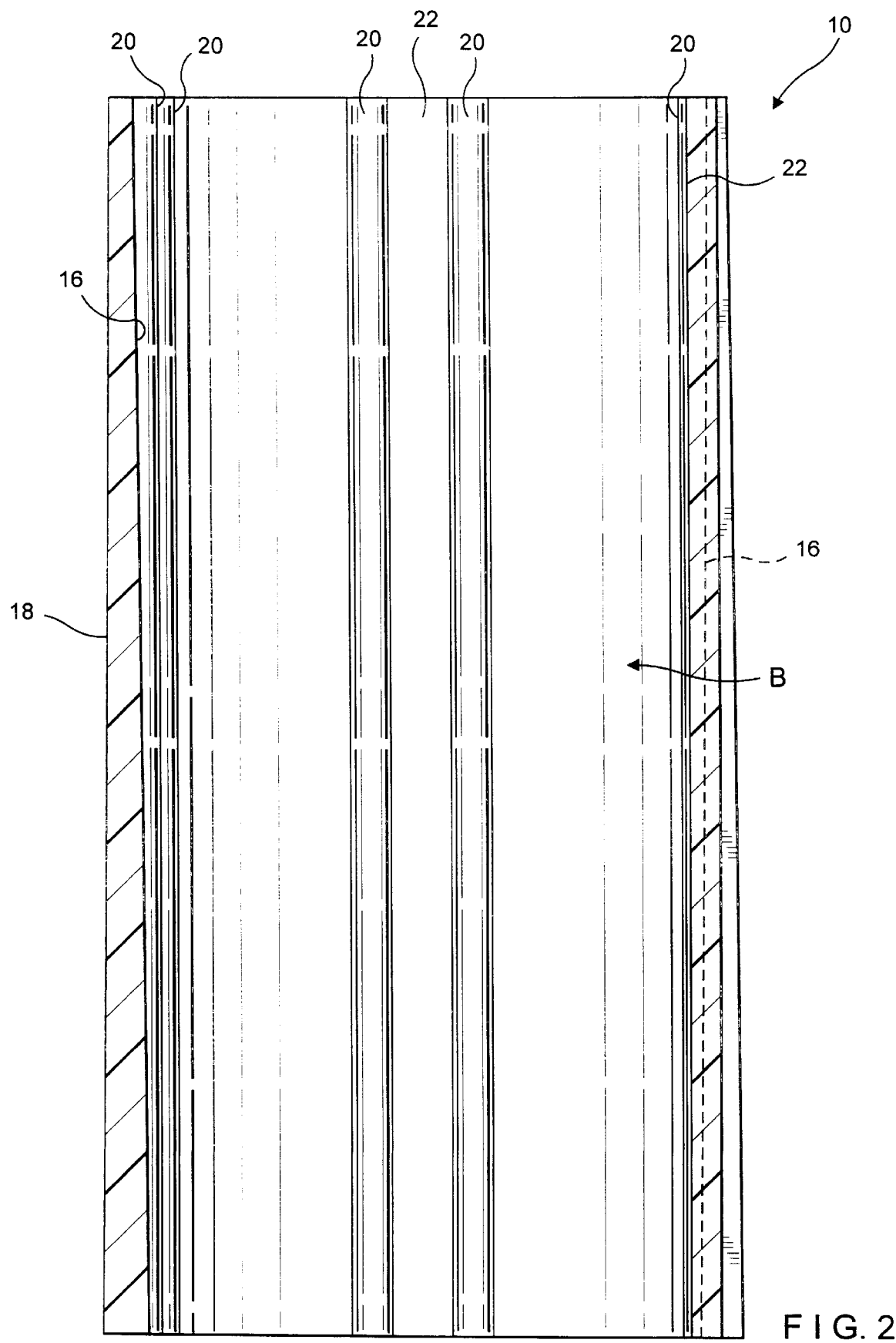
FIG. 2 is a cross-sectional view of the head rest sleeve.

Integrally molded with inside portion 16 are four pairs P1, P2, P3, P4 of compressible crush ribs 20 and four webs 22 located between each pair of crush ribs. There are also four indentations 24 located behind each pair of crush ribs 20. While a minimum of two pairs of diametrically opposed crush ribs 20 are needed in order for the present invention to achieve the aforementioned objectives, typically four pairs of crush ribs are used, with a spacing of eighty (80) degrees between first pair P1 and second pair P2, one-hundred (100) degrees between second pair P2 and third pair P3, eighty (80) degrees between third pair P3 and fourth pair P4, and one-hundred (100) degrees between fourth pair P4 and first pair P1. The number of pairs of crush ribs 20 which can be used is limited only by the diameter of bore B. Crush ribs 20 and webs 22 extend longitudinally the length of body 12. As illustrated in FIG. 2, although inside wall portion 18 is slightly tapered (drafted) to allow for easy removal of head rest sleeve 10 from the injection mold during manufacture, crush ribs 20 and webs 22 are given no draft. As will be discussed below, this allows for a constant and evenly distributed friction force between support rod 14 and head rest sleeve 10. Crush ribs 20 are substantially circular in shape and protrude radially an equal distance such that a circle C1 drawn concentric with bore B and tangent to crush ribs 20 has a diameter D1. Similarly, webs 22 protrude radially an equal distance such that a circle C2 drawn concentric with bore B and tangent to webs 22 has a diameter D2 which is greater than diameter D1.

Typical head rests utilize two support rods 14 which are insertable into two head rest sleeves 10 embedded in a seat (not pictured). While support rods are manufactured in standard sizes (e.g. 10 mm), because of unavoidable errors introduced in the manufacturing process the actual diameter of the support rod may be greater than or less than the standard size. Thus, support rods are manufactured such that the actual diameter D falls within a specified tolerance range ±t. A tolerance is merely the total permissible variation in the size of a part. Thus, a support rod with a standard diameter D may actually have a diameter as large as D+t or a diameter as small as D−t. This phenomenon is a significant factor in the causation of buzz, shake and rattle, and side-to-side chuck.

In order to ensure a tight friction fit between head rest sleeve 10 and support rod 14 regardless of where the actual diameter of support rod 14 has fallen in the tolerance range, the size of crush ribs 20 are chosen such that diameter D1 of circle C1 is equal to the minimum possible value of the diameter of support rod 14, namely D−t. Similarly, the size of webs 22 are chosen such that diameter D2 of circle C2 is equal to the maximum possible value of the diameter of support rod 14, namely D+t. In this way support rod 14 will be in frictional engagement with the inside of head rest sleeve 10 regardless of its actual diameter.

Figure 3:
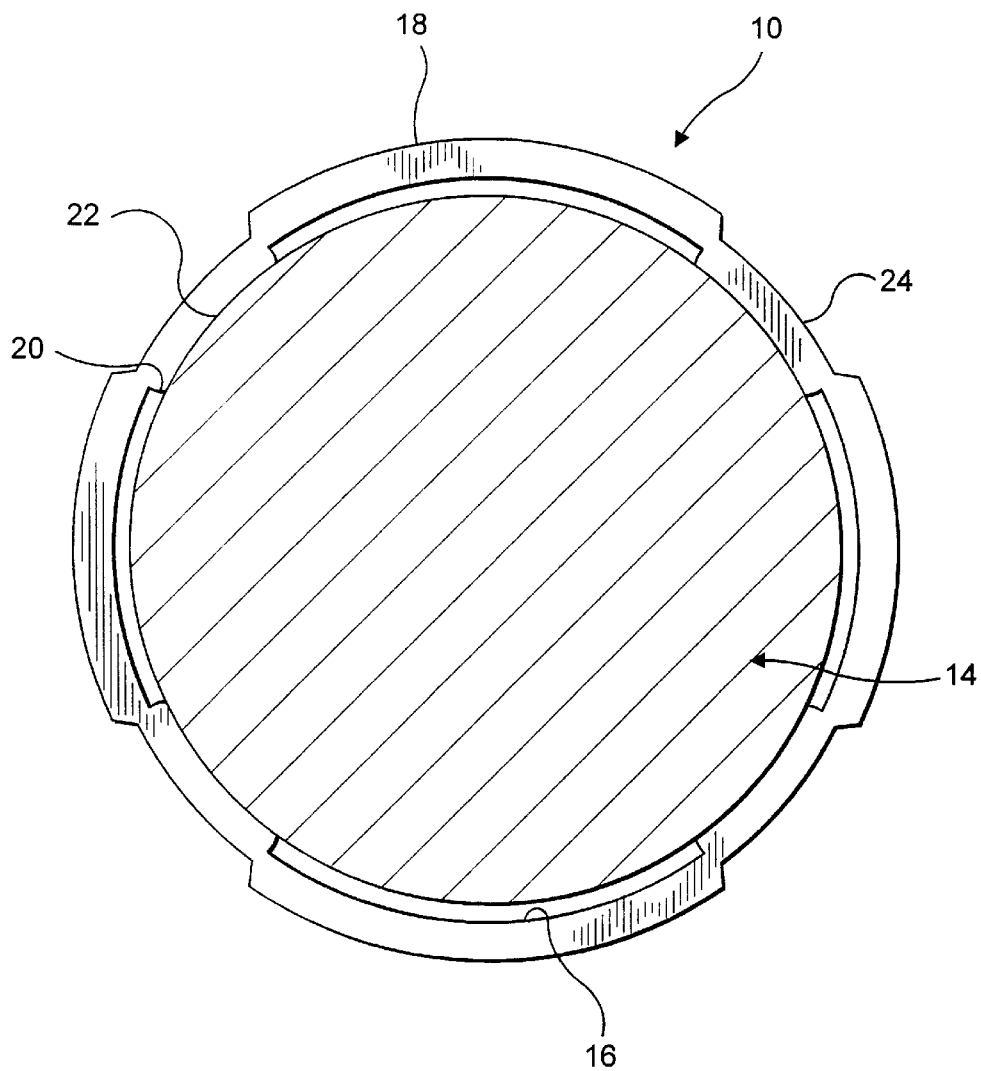
FIG. 3 is a top view of a support rod having a maximum diameter inserted into the head rest sleeve.
Figure 4:
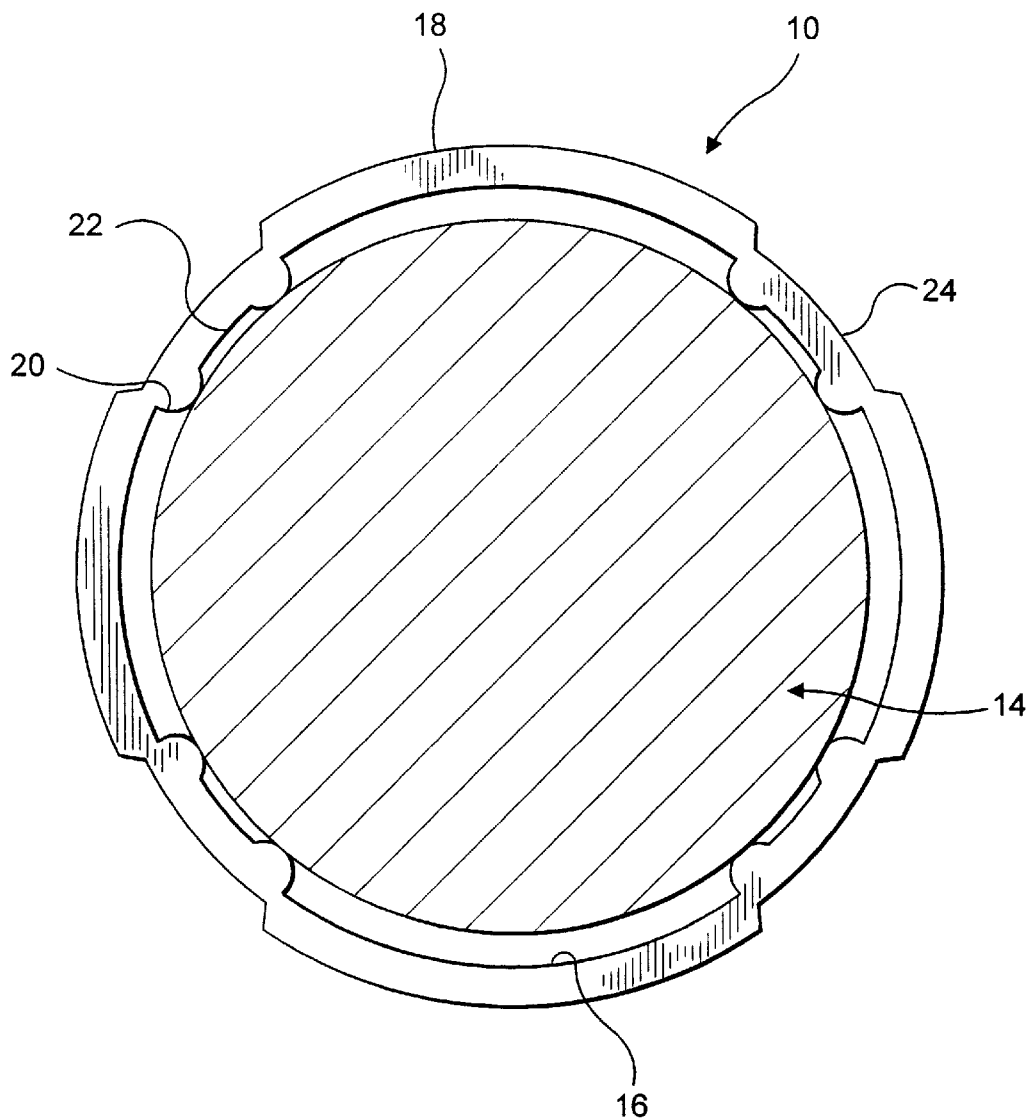
FIG. 4 is a top view of a support rod having a minimum diameter inserted into the head rest sleeve.
Figure 5:
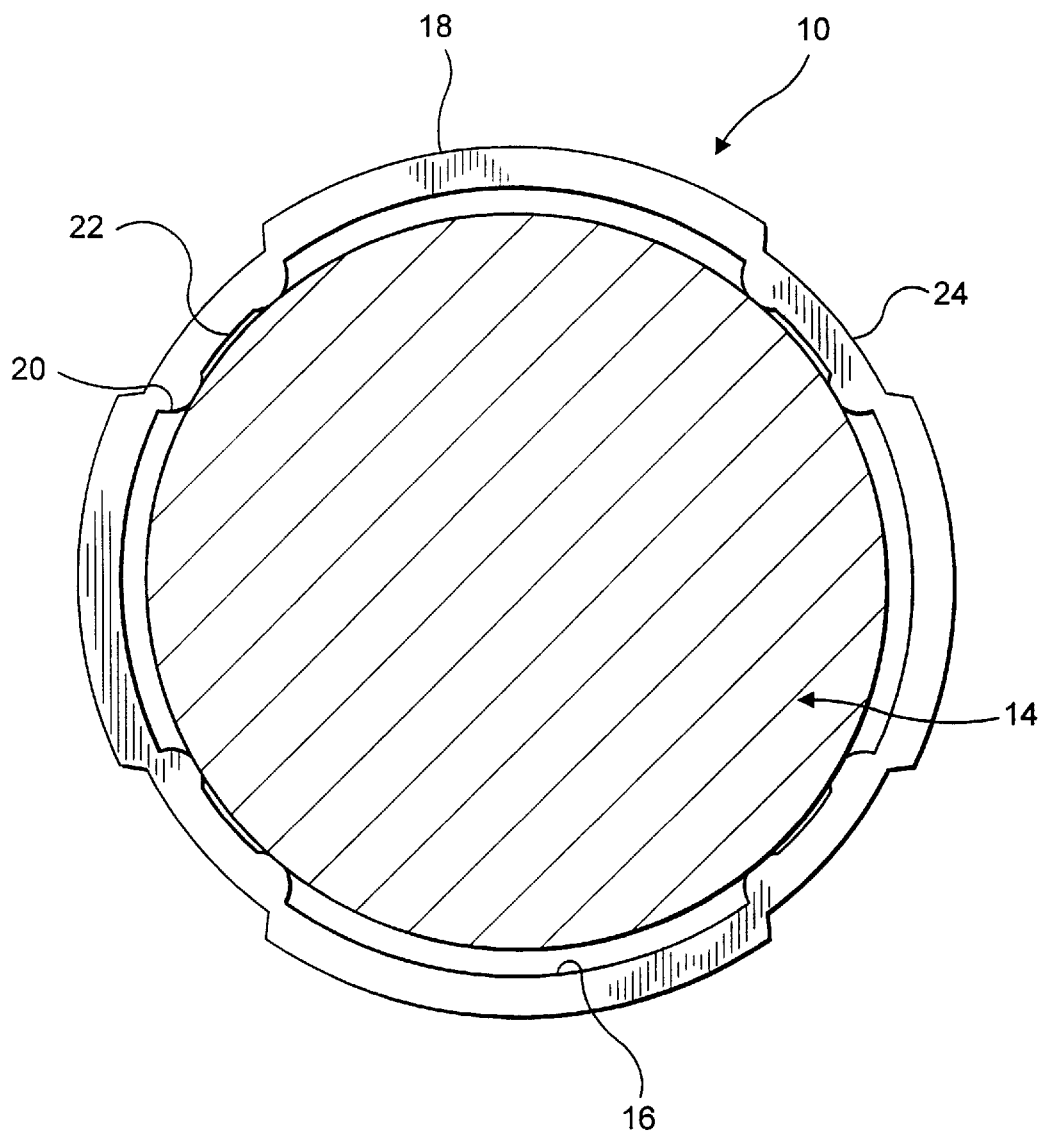
FIG. 5 is a top view of a support rod having an intermediate diameter inserted into the head rest sleeve.

In operation there are three possible scenarios. The first scenario, illustrated by FIG. 3, is that the diameter of support rod 14 is a maximum D+t. When support rod 14 is inserted into head rest sleeve 10 it will engage crush ribs 20. The force developed therein due to this engagement will uniformly compress crush ribs 20 a distance 2t such that crush ribs 20 become even with webs 22, thereby allowing support rod 14 to enter head rest sleeve 10. Once rod 14 is so inserted it will be in tight and uniform frictional engagement along its entire length with crush ribs 20 and webs 22. The second scenario, illustrated by FIG. 4, is that the diameter of support rod 14 is a minimum D−t. When support rod 14 is inserted into head rest sleeve 10 it will frictionally engage crush ribs 20. However, because the diameter of support rod 14 is equal to diameter D1, there will be no compression of crush ribs 20. The third scenario, illustrated by FIG. 5, is that the diameter of support rod 14 has an intermediate value, such as D. In that case crush ribs 14 will be compressed a distance which depends on the diameter of support rod 14, and support rod 14 will be in frictional engagement with crush ribs 20, and not webs 22. Indented portions 24 provide crush ribs 20 and webs 22 with flexibility and ensure that the friction fit between head rest sleeve 10 and support rod 14 is not so great that extraction of support rod 14 from head rest sleeve 10 will be unduly burdensome to the head rest user.

In order to ensure that there is a constant and evenly distributed friction force on support rod 14 as it is inserted into and pulled from head rest sleeve 10, thereby allowing for smooth and easy adjustment of the head rest by the user, no draft is used upon crush ribs 20 or webs 22 during the molding process. This is demonstrated in FIG. 2, where inside portions 16 are slightly tapered and crush ribs 20 and webs 22 are vertical. This guarantees that the portion of support rod 14 inserted into head rest sleeve 10 will be in uniform frictional engagement with crush ribs 20 along its entire length, and that the degree of compression of crush ribs 20 will be uniform, thereby resulting in a constant and evenly distributed frictional force on support rod 14. If crush ribs 20 and webs 22 were drafted, there would be an uneven mating with cylindrical support rod 14, resulting in non-constant frictional force between head rest sleeve 10 and support rod 14.

It is thus apparent that regardless of the actual diameter of support rod 14 within its tolerance range, a tight and uniform friction fit between support rod 14 and the inside of the head rest sleeve 10 will be guaranteed, eliminating the problems of buss-shake-rattle and side-to-side chuck and allowing for smooth and easy adjustment of the head rest by the user.

We claim:

1. A head rest sleeve for receiving a cylindrical head rest support rod having a diameter within a predefined tolerance range limited by a maximum diameter and a minimum diameter, said head rest sleeve formed of resilient material and comprising:

an elongated body having an outside portion and an axial circular bore extending therethrough for receiving said support rod, said axial bore defining an inside portion of said body;

at least two pairs of compressible ribs integral with said inside portion and extending the length of said body, said ribs protruding radially to frictionally engage with said support rod;

at least two webs located between said pairs of ribs and integral therewith, said webs protruding radially a distance less than said protrusion of said ribs to frictionally engage with said support rod;

wherein when said support rod is inserted into said bore said support rod frictionally engages said ribs when said diameter of said support rod is greater than or equal to said minimum diameter and engages said webs in addition to said ribs when said diameter of said support rod is equal to said maximum diameter.

2. The head rest sleeve according to claim 1 wherein:

said head rest sleeve is molded;

said inside portion of said body is drafted; and said ribs and said webs are not drafted.

3. The head rest sleeve according to claim 1 wherein said outside portion of said body has at least two indentations extending the length of said body, said indentations being located behind said pairs of ribs.

4. The head rest sleeve according to claim 1 wherein said resilient material is plastic.

5. The head rest sleeve according to claim 1 wherein there are an even number of said pairs of ribs, said pairs of ribs arranged such that each one of said pairs is diametrically opposite another of said pairs.

6. The head rest sleeve according to claim 1 wherein there are four pairs of ribs, said four pairs of ribs arranged such that a first pair is eighty degrees removed from a second pair, said second pair is one-hundred degrees removed from a third pair, and said third pair is eighty degrees removed from a fourth pair.

* * * * *